United States Patent
Acef

(10) Patent No.: US 10,222,678 B2
(45) Date of Patent: Mar. 5, 2019

(54) FREQUENCY-TUNABLE LASER SOURCE AND METHOD FOR EMITTING A FREQUENCY-TUNABLE LASER BEAM

(71) Applicants: CENTRE NATIONAL DE LA RECHERCHE SCIENTIFIQUE—CNRS, Paris (FR); Observatoire de Paris, Paris (FR)

(72) Inventor: Mohand Ouali Acef, Paris (FR)

(73) Assignees: Centre National De La Recherche Scientifique—CNRS, Paris (FR); Observatoire de Paris, Paris (FR)

(*) Notice: Subject to any disclaimer, the term of this patent is extended or adjusted under 35 U.S.C. 154(b) by 0 days.

(21) Appl. No.: 15/562,350

(22) PCT Filed: Mar. 23, 2016

(86) PCT No.: PCT/EP2016/056434
§ 371 (c)(1),
(2) Date: Sep. 27, 2017

(87) PCT Pub. No.: WO2016/156160
PCT Pub. Date: Oct. 6, 2016

(65) Prior Publication Data
US 2018/0356706 A1 Dec. 13, 2018

(30) Foreign Application Priority Data
Mar. 27, 2015 (FR) .................................... 15 52593

(51) Int. Cl.
*G02F 1/37* (2006.01)
*G02B 27/10* (2006.01)
(Continued)

(52) U.S. Cl.
CPC ........... *G02F 1/37* (2013.01); *G02B 27/1006* (2013.01); *G02F 1/3532* (2013.01);
(Continued)

(58) Field of Classification Search
CPC ........ G02F 1/3532; G02F 1/3534; G02F 1/37; G02B 27/1006; H01S 3/067; H01S 3/2308; H01S 3/2391
See application file for complete search history.

(56) References Cited

U.S. PATENT DOCUMENTS 3,636,356 A * 1/1972 Giordmaine .......... G02F 1/3534
359/326
6,665,320 B1 12/2003 Arbore et al.
(Continued)

FOREIGN PATENT DOCUMENTS

WO 98/07219 A1 2/1998
WO 2014/170331 A1 10/2014

OTHER PUBLICATIONS

International Search Report of the International Searching Authority issued in PCT/EP2016/056434 dated May 25, 2016 (3 pages).
(Continued)

*Primary Examiner* — Daniel Petkovsek
(74) *Attorney, Agent, or Firm* — Osha Liang LLP

(57) ABSTRACT

According to an aspect, the present description concerns a frequency-tunable laser source comprising: a set of N elementary sources (101-$k$), each elementary source being suitable for emitting a beam at a given central frequency ($f_k$); an optical coupler (12) for coupling the beams emitted by each of the elementary sources in order to form a multi-spectral incident beam ($B_{in}$) regrouping all the frequencies of the N elementary sources in a same optical beam; a beam splitter (15) for forming, from the incident beam ($B_{in}$), a first beam ($B_1$) and a second beam ($B_2$), each regrouping all the frequencies of the elementary sources; a first tunable filter (16) for selecting, from the first beam ($B_1$), a third beam ($B_3$) at a first frequency ($F_j$); a second tunable filter (17) for selecting, from the second beam ($B_2$), a fourth beam ($B_4$) at a second frequency ($F_l$); a nonlinear frequency
(Continued)

doubling crystal (18) for generating, from the third beam at the first frequency ($F_j$), a fifth beam ($B_5$) having a frequency ($F_{2j}$) which is twice the first frequency; a nonlinear sum-frequency generation crystal (19) for generating, from the fifth beam coming from the nonlinear frequency doubling crystal and from the fourth beam at the second frequency ($F_l$), a beam ($B_{out}$) having a frequency ($F_{2j+1}$) equal to the sum of twice the first frequency ($F_{2j}$) and the second frequency ($F_l$).

12 Claims, 3 Drawing Sheets

(51) Int. Cl.
    *G02F 1/35*         (2006.01)
    *H01S 3/23*         (2006.01)
    *H01S 3/067*       (2006.01)

(52) U.S. Cl.
    CPC ............ *G02F 1/3534* (2013.01); *H01S 3/067* (2013.01); *H01S 3/2308* (2013.01); *H01S 3/2391* (2013.01)

(56) References Cited

U.S. PATENT DOCUMENTS

| | | | |
|---|---|---|---|
| 8,373,924 B2* | 2/2013 | Starodoumov | G02F 1/39 359/328 |
| 9,329,452 B2* | 5/2016 | Ouyang | G02F 1/11 |
| 9,690,165 B2* | 6/2017 | Acef | G02F 1/3532 |
| 2005/0063040 A1 | 3/2005 | Lee et al. | |
| 2008/0075130 A1* | 3/2008 | Mizuuchi | G02F 1/37 372/6 |

OTHER PUBLICATIONS

Written Opinion of the International Searching Authority issued in PCT/EP2016/056434 dated May 25, 2016 (5 pages).

Schneider, T.; "Fiber-laser frequency combs for the generation of tunable single-frequency laser lines, mm- and THz-waves and sinc-shaped Nyquist pulses"; Proceedings of SPIE, vol. 9378, Mar. 4, 2015, pp. 937822-1 to 937822-8 (8 pages).

* cited by examiner

|  |  |  |  |  |  |  |  |
|---|---|---|---|---|---|---|---|
| 3*F1 | 2*F1+F2 | 2*F1+F3 | 2*F1+F4 | 2*F1+F5 |  | 2*F1+Fk |  |
| 2*F2+F1 | 3*F2 | 2*F2+F3 | 2*F2+F4 |  |  | 2*F2+Fk |  |
| 2*F3+F1 | 2*F3+F2 | 3*F3 | 2*F3+F4 |  |  | 2*F3+Fk |  |
| 2*F4+F1 | 2*F4+F2 |  | 3*F4 | 2*F4+F5 |  | 2*F4+Fk |  |
| 2*F5+F1 |  |  |  | 3*F5 |  | 2*F5+Fk |  |
|  |  |  |  |  |  |  |  |
| 2*Fk+F1 |  |  |  |  |  | 3*Fk |  |
|  |  |  |  |  |  |  |  |

FIG.2

FREQUENCY-TUNABLE LASER SOURCE AND METHOD FOR EMITTING A FREQUENCY-TUNABLE LASER BEAM

PRIOR ART

Technical Field

The present description relates to a frequency-tunable laser source, in particular in the visible range and in the ultraviolet range, and to a method for emitting a frequency-tunable laser beam.

Prior Art

Laser sources emitting in the visible spectral range, typically between 400 and 800 nm, have numerous applications in fields such as the biomedicine, spectroscopy, laser remote sensing, atomic physics, chemical analysis or also fluorometry, marine holography. The commercially available sources in this spectral range include, for example, dye lasers, argon lasers, helium neon lasers, which, in practice, are of large volume or difficult to use, or laser diodes which have a low power output in this wavelength range.

In order to obtain compact and powerful sources in this wavelength range, it is also known to use powerful laser diodes in the infrared range and coupled to nonlinear frequency doubling or tripling crystals, for example. An example is given in the article by P. Polynkin et al., "Laser Transmitter Undersea Communications using Third Harmonic Generation of Fiber-Laser System at 1.58 μm" *IEEE Photonics Technology Letters*, Vol. 19, No. 17, September 2007. This article presents a laser source in the visible range, based on the use of a source at 1.5 μm, coupled to two cascade crystals, a first frequency doubling crystal and a second sum-frequency crystal.

For some applications, particularly in the biomedical field, remote laser sensing, and spectroscopy, or in atomic physics, for example, for atomic cooling applications, tunable sources in the visible range are sought, that is to say sources having an emission wavelength that can be changed over a given frequency range.

The wavelength tunability (in other words the frequency tunability) around the central emission frequency of a laser source, is generally obtained by changing one or more internal parameters which govern the laser emission frequency. In the case of a laser diode, these parameters can be the temperature or the injection current applied to it.

However, the wavelength range that is attainable by varying the internal parameters of a laser diode is approximately 0.15 nm for a central wavelength of 1.5 μm. Therefore, more than 30 laser diodes would be required to cover a range of tunability of 5 nm, for example, which typically corresponds to the spectral acceptance of the nonlinear crystals. The system would then be complex and, in the end, not very compact.

The wavelength tunability can also be obtained by using an external cavity which is also referred to as extended cavity. In this configuration, one of the surfaces of the laser diode has an antireflection treatment. The light emitted through the antireflection surface is coupled again into the diode by means of an external reflector forming a first mirror of the laser cavity, the other mirror of the cavity being Ruined by the surface (without antireflection treatment) of the laser diode opposite the surface with antireflection treatment. The light that is not reflected by the surface without antireflection treatment is emitted outside of the cavity and foil is the useful laser beam. In order to obtain a frequency-tunable emission using such a device, the external reflector used is wavelength-selective, the selectivity varying, for example, as a function of the angle of incidence on the external reflector. Such systems, which are commercially available, make it possible to obtain an emission that is continuously tunable over a spectral band of more than 100 nm. Nevertheless, such performances require very precise adjustments during assembly and a very good mechanical stability of the device.

The present invention proposes a compact and tunable laser source, which has low sensitivity to the environment or to the conditions of use, for emitting beams with high optical output (typically several hundred mW), including in the visible range.

SUMMARY

According to a first aspect, the present description concerns a frequency-tunable laser source comprising:
a set of N elementary sources, N≥2, each elementary source being suitable for emitting a beam at a given central frequency with a given spectral width;
an optical coupler for coupling the beams emitted by each of the elementary sources in order to form a multi-spectral incident beam regrouping all the frequencies of the N elementary sources in a same optical beam;
a beam splitter for forming, from the incident beam, a first beam and a second beam, each regrouping all the emission frequencies of the elementary sources;
a first tunable filter for selecting, from the first beam, a third beam at a first frequency;
a second tunable filter for selecting, from the second beam, a fourth beam at a second frequency;
a nonlinear frequency doubling crystal for generating, from the third beam at the first frequency, a fifth beam having a frequency which is twice the first frequency;
a nonlinear sum-frequency generation crystal for generating, from the fifth beam coming from the nonlinear frequency doubling crystal and from the fourth beam at the second frequency, a beam having a frequency equal to the sum of twice the first frequency and the second frequency.

Such a tunable source has the advantage of providing access to a broad spectral range using a limited number of elementary sources. Thanks to the limited number of elementary sources, the source obtained is compact and takes up little space.

According to one or more embodiments, the elementary sources can be laser diodes, solid lasers or fiber lasers. In particular, the laser diodes take up little room and they are economical. The fiber lasers are powerful and have a larger range of tunability.

According to one or more embodiments, each of the elementary sources has a spectral band of tunability. The tunability of each of the elementary sources makes it possible to vary the central emission frequencies of the elementary sources and thus to increase the tunability of the source overall.

According to one or more embodiments, the differences between the central frequencies of two elementary sources having adjacent central frequencies are greater than the tunable spectral band of each of said elementary sources. This configuration makes it possible to broaden the spectral range of tunability of the laser source.

According to one or more embodiments, the differences between the central frequencies of two elementary sources having adjacent central frequencies are greater than the spectral width of each of said elementary sources; in this case as well, the spectral range of tunability of the laser source is broadened. According to one or more embodiments, the frequency-tunable laser source comprises an amplifier for amplifying the multi-spectral incident beam.

According to one or more embodiments, the frequency-tunable laser source is completely or partially a fiber laser source. Thus, the source has low sensitivity to optical malfunction and it can be moved easily or used in on-board systems.

According to one or more examples, the frequency-tunable laser source comprises at least one control model suitable for optimizing the coupling in at least one of the nonlinear frequency doubling and sum-frequency generation crystals. Thus, the emission of the tunable source is optimized as a function of the needs downstream of the tunable laser source.

According to one or more examples, the frequency-tunable laser source comprises a temperature control system of the nonlinear crystals. This system makes it possible to optimize the output and the operation of the crystals by adjusting their bandwidth with the selectivity of the optical filters.

According to a second aspect, the present description concerns a method for emitting a frequency-tunable laser beam, comprising:

generating, from beams emitted by a set of elementary sources, a multi-spectral incident beam regrouping all the emission frequencies of said elementary sources;

splitting the incident beam into a first beam and a second beam, each regrouping all the emission frequencies of said elementary sources;

selecting, from the first beam and by means of a first tunable filter, a third beam at a first frequency;

selecting, from the second beam and by means of a second tunable filter, a fourth beam at a second frequency;

generating, by means of a nonlinear frequency doubling crystal and from the third beam at the first frequency, a fifth beam having a frequency which is twice the first frequency;

generating, by means of a nonlinear sum-frequency generation crystal and from the fifth beam coming from the nonlinear frequency doubling crystal and from the fourth beam at the second frequency, a beam having a frequency equal to the sum of twice the first frequency and the second frequency.

According to one or more embodiments, the laser emission is continuous.

BRIEF DESCRIPTION OF THE DRAWINGS

Other advantages and features of the object of the description will become apparent upon reading of the description, illustrated by the following figures:

FIG. 2, a table presenting frequencies accessible by means of an emission method according to an example of the present description;

DETAILED DESCRIPTION

Figure 1A:
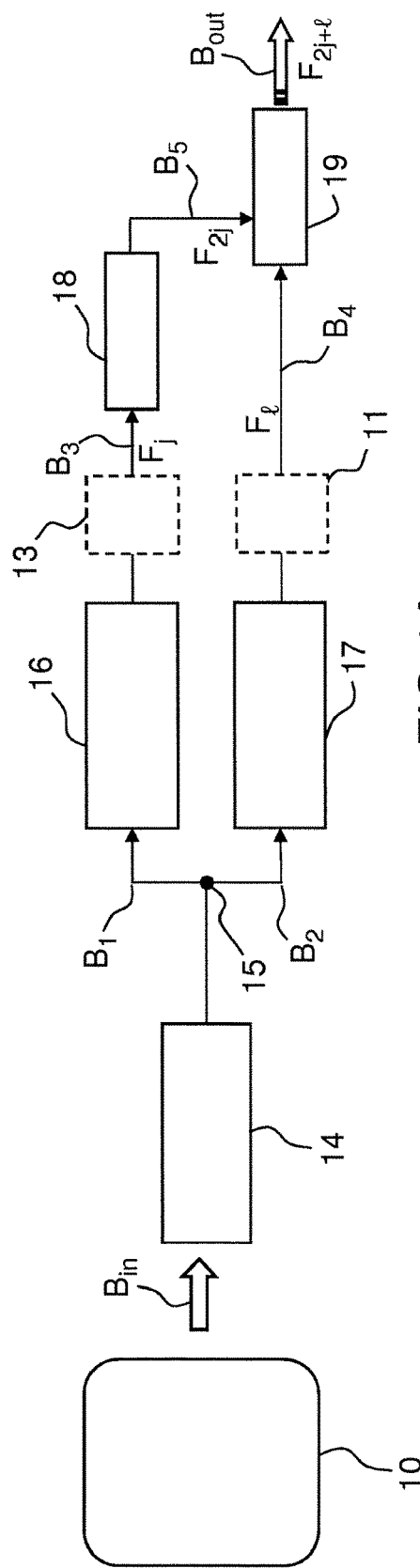
FIGS. 1A and 1B, diagrams illustrating a frequency-tunable laser source according to an example of the present description and an example of a device for generating a multi-spectral incident beam.

In the figures, identical elements are identified by the same reference numerals.

Figure 1B:
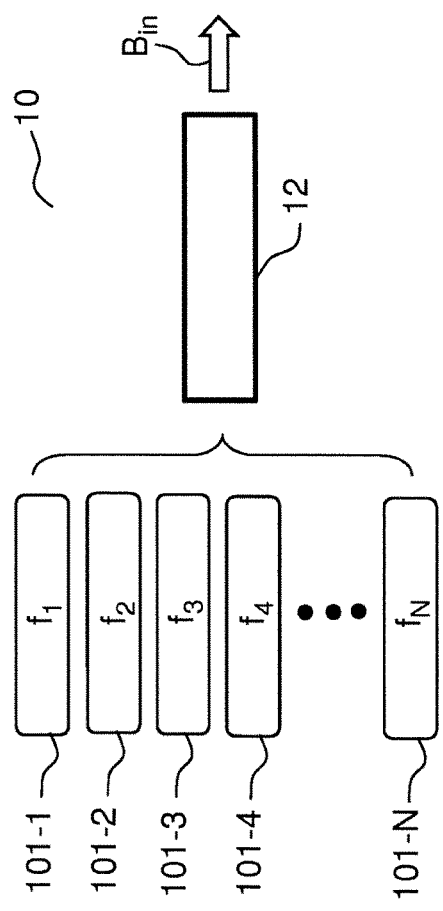

FIGS. 1A and 1B illustrate a frequency-tunable laser source according to an example of the present description and a device for emitting a multi-spectral incident beam using a set of elementary sources, respectively.

The frequency-tunable laser source represented in FIG. 1A comprises a device 10 for emitting a multi-spectral incident laser beam, an optical amplifier 14, a beam splitter 15, a first tunable optical filter 16, a second tunable optical filter 17, a frequency doubling crystal 18 or SHG (for "Second Harmonic Generation") crystal and a sum-frequency generation crystal 19 or SFG (for "Sum-Frequency Generation") crystal.

An example of a device 10 for emitting a multi-spectral incident laser beam $B_{in}$ is represented in FIG. 1B. It comprises a set of N elementary sources 101-1, 101-2, . . . , 101-N, where N≥2, each elementary source 101-k being suitable for emitting a laser beam having a given central frequency $f_k$ with a given spectral width and a difference $\Delta f_k$ between the central frequencies $f_k$ and $f_{k+1}$ of two elementary sources having adjacent frequencies. The device 10 also comprises an optical coupler 12 for forming, from the laser beams emitted by all the elementary sources, a single incident beam $B_{in}$ of which the spectrum is formed by the union of the spectra of the elementary sources. It is, for example, a wavelength multiplexer such as that sold by the company Optospan©. Such an optical coupler 12 can have the advantage of maintaining the polarization.

According to a variant, each elementary source 101-k can be tunable over a given frequency range $\delta f_k$.

According to a variant, the elementary sources are fiber lasers such as an erbium fiber laser, solid lasers such as an Nd:YAG laser or an Nd:GAGG laser, or laser diodes. The sources can have a continuous or pulsed emission, for example, in one of the bands around 1.5 µm or around 1 µm. The fiber lasers generally have a greater tunability than that of a laser diode, which can make it possible to vary the central emission frequencies of the elementary sources and to further increase the tunability of the source overall; for example, the erbium fiber laser has a wavelength tunability of approximately 1000 pm, varying the temperature of the laser by 30° C., whereas the tunability of a laser diode is approximately 5 to 10 times less, for example, 150 pm, varying the temperature of the diode by 10° C. On the other hand, the laser diodes offer the advantage of compactness. In fact, a laser diode has a volume on the order of a few cm³ and weighs less than 100 g, while a fiber laser has a width of approximately 50 cm and weighs around 7 kg. The optical amplifier 14, for example, an erbium-doped fiber amplifier for a band around 1.5 µm or an ytterbium fiber amplifier for a band around 1 µm makes it possible to amplify the multi-spectral incident beam $B_{in}$, in order to supply the necessary optical output. The optical amplifier provides the advantage of having a broad spectral acceptance; a single component can thus be used for amplifying the multi-spectral incident beam; the same component can also be used when the elementary sources are modified in order to cover a spectral band other than those mentioned above. The optical amplifier 14 can provide the advantage of maintaining the polarization.

It is also possible to dispense with an optical amplifier if the optical output of the multi-spectral incident beam is sufficient for generating a nonlinear-mechanism in the crystals, typically around 0.5 watt.

When the device of the present description is operating in free space, it is possible to use a multi-spectral incident beam having a greater optical output than when the device is operating in the fiber regime as described below. In fact, the connections between the currently commercially available fibers and nonlinear crystals are less resistant to the high optical outputs.

An example of a method for tunable laser emission is described in FIG. 1A.

After amplification by means of the amplifier 14 if necessary, the multi-spectral incident beam $B_{in}$ is split into two beams by the beam splitter 15, a first beam $B_1$ and a second beam $B_2$. The ratio of the optical outputs at each of the channels can be optimized as a function of the outputs required downstream in the tunable laser source 1. Each of the first and second optical beams regroups as the multi-spectral incident beam $B_{in}$ all the emission frequencies of the elementary sources.

The first beam $B_1$ is sent to a first tunable optical fiber 16 in order to form a third optical beam $B_3$ at a first frequency $F_j$ which is selected from the frequencies of the spectrum of the multi-spectral incident beam. The second beam $B_2$ is sent to a second tunable optical filter 17 for forming a fourth optical beam $B_4$ at a second frequency $F_l$ which is also selected from the frequencies of the spectrum of the multi-spectral incident beam. The two tunable optical filters work simultaneously but independently of one another, in such a manner that the first and second frequencies $F_j$ and $F_l$ of the third and fourth beams can be selected completely independently. The first and second frequencies $F_j$ and $F_l$ of the third and fourth beams can be equal to one and the other of the central frequencies of two of the elementary laser sources, so as to benefit from a better optical output.

The tunable optical filters 16 and 17 can be, for example, Fabry Pérot cavities, continuously frequency-tunable optical networks, or continuously tunable optical filters with maintaining of polarization, such as those sold by IDIL Products©, these filters being capable of filtering a wavelength around 1550 nm with a resolution of 0.1 nm in a spectral range of 40 nm; the tunable optical filters 16, 17 can also be multiple-application tunable optical filters such as those sold by JDSU©, these filters being capable of filtering wavelengths between 1520 and 1630 nm with a resolution of 0.2 nm. The optical filters can offer the advantage of maintaining the polarization.

The third beam $B_3$ at the first frequency $F_j$, is coupled in the nonlinear frequency doubling crystal 18 for generating a beam $B_5$ having a frequency $F_{2j}$ that is twice $F_j$. By varying the first tunable optical filter 16 arranged upstream, it is thus possible to successively generate the harmonics $2*F_j$ of each of the possible frequencies $F_j$ of the incident beam, and this in the bandwidth permitted by the nonlinear frequency doubling crystal. Thus, for example, $2*F_j$ can take on the values $2*f_1, 2*f_2 \ldots 2*f_N$, where $f_1, f_2, \ldots, f_N$ are the central emission frequencies of the elementary sources. According to a variant, an appropriate optical filter (not represented in FIG. 1A) is arranged at the output of the doubling crystal 18 in order to cut out the residual radiation at the frequency The fourth beam $B_4$ at the second frequency $F_1$, which has not passed through the first nonlinear crystal 18, is coupled with the beam $B_5$ at the frequency $F_{2j}=2*F_j$ in the nonlinear sum-frequency generation crystal 19 in order to obtain the sum of frequencies $F_{2j}$ and $F_l$, resulting in an output beam $B_{out}$ of which the frequency $F_{2j+l}$ is equal to $F_{2j}+F_l$. In the same manner as above, and independently of the adjustment of the first tunable optical filter, it is possible, by adjusting the second tunable optical filter 17 arranged upstream, and this in the bandwidth permitted by the nonlinear sum-frequency generation crystal, to successively generate a set of harmonics $(2*F_j+F_l)$ referred to as $F_{2j+l}$ for each one of the possible frequencies $F_k$ of the incident beam B. For example, $f_{2j+l}$ can take on the values $2*f_j+f_1, 2*f_j+f_2, \ldots, 2*f_j+f_k, \ldots 2*f_1+f_N$. The residual beams coming from the second nonlinear crystal 18 and having a frequency $2*F_j$, and $F_l$, respectively, can be used or filtered.

The crystals 18, 19 for the doubling and sum-frequency generation are lithium niobate (LiNbO3) crystals, for example. Other crystals can be used in a known manner, such as, for example, potassium titanyl phosphate which is used in a periodically polarized structure (or PPKTP), or BBO (beta barium borate) or LBO (lithium triborate), if the emission method is applied in the UV range.

According to a variant, the tunable laser source can comprise a control module 11 and/or 13 (represented with dotted lines in FIG. 1A) for optimizing the coupling in at least one of the nonlinear crystals 19, 18, respectively. Thus, the control module 11 makes it possible to control parameters of the fourth beam $B_4$ in view of optimizing the coupling in the nonlinear sum-frequency generation crystal 19 and as a function of the characteristics required downstream of the tunable laser source. These parameters can be geometric, polarization and/or output parameters. The control module 13 can be installed for controlling the parameters of the third beam $B_3$ in order to optimize the doubling efficiency via the crystal 18. The tunable laser source can thus comprise two control modules for controlling the parameters of the fourth beam $B_4$ and of the third beam $B_3$. The control module can offer the advantage of maintaining the polarization.

The output at the output of the tunable laser source can also be optimized by adjusting the selection of the optical filters so that they transmit the maximum optical output at the output of the first tunable filter 16 at the frequency Fj and the maximum optical output at the output of the second tunable filter 17 at the frequency $F_l$. A temperature control of one and/or the other of the nonlinear crystals can also be carried out in order to optimize the nonlinear conversion efficacy by the "Second Harmonic Generation" and "Sum-Frequency Generation" processes and thus ensure the optimization of the output and of the operation of the nonlinear crystals.

The frequency-tunable laser source thus described makes it possible to generate, in particular, $N^2$ optical beams oscillating at frequencies $(2*f_j+f_l)$ by combining the N different central frequencies $f_k$ (N greater than or equal to 2) contained in the multi-spectral incident beam. The central frequencies being, for example, in a spectral range within the C band or within the L band, the result is the generation of frequencies in the visible range (between 480 nm and 540 nm), it being possible to obtain some of these frequencies by a conventional frequency tripling process, that is to say by simply substituting the laser sources upstream of nonlinear crystals without splitting or tunable optical filters.

The table of FIG. 2 illustrates a matrix of $N^2$ frequencies which can be generated by means of N elementary sources by selecting, by means of the two tunable optical filters, the N central emission frequencies contained in the multi-spectral incident beam. Among these $N^2$ frequencies, there are the diagonal elements 204 (elements on dotted background) and the non-diagonal elements 202 (elements on white background). The diagonal elements 204 of this table correspond to the frequencies $3*f_k$, that is to say when the tunable optical fibers are adjusted to have $f_j=f_l$. The non-diagonal elements 202 correspond to the new frequencies $(2*f_j+f_l)$ for $f_j$ different from $f_l$; these frequencies cannot be obtained by a frequency tripling process according to the prior art.

The frequency-tunable range of the tunable laser source thus obtained depends on a certain number of parameters, including the number of elementary sources used, the central frequency (or central wavelength) of emission of each elementary source 101-1 to 101-N, the intrinsic tunability $\delta f_k$ of each of the elementary sources, and the difference $\Delta f_k$ between the central frequencies of the elementary sources. Thus, for a given number of elementary sources, by selecting elementary sources with variously spaced central frequencies, it will be possible to promote a tunable spectrum with a better continuity between the frequencies but a smaller frequency range, or vice versa. The range of tunability is also limited by the bandwidth of the two nonlinear crystals used. On the other hand, the bandwidths of the tunable optical filters, of the amplifier and of the optical coupler are generally not limiting factors, because they are much larger than those of the nonlinear crystals.

In practice, one may wish to produce, for example, a beam having a visible frequency $F_u$ in the visible range or the UV range via a nonlinear crystal; however, no laser source having a central frequency $f_p=1/3*F_u$ making it possible to obtain $F_u$ by a nonlinear process of known type exists. By applying the method according to the present description, one can select a set of elementary sources comprising at least two elementary sources of which the frequencies $f_j$ and $f_l$ are such that frequency $F_u$ is equal to $(2*f_j+f_l)$.

If one wishes in addition to produce alternatively (successively or randomly) a set of frequencies $F_u$, it will be possible, by using the device and the method of the present description, to change the frequency $F_u$ of the beam coming from the tunable source without changing the elementary sources in the experimental device, but rather, for example, by simple adjustment of the operating parameters of the filters 16 and 17 and of the crystals 18 and 19.

Figure 3A:
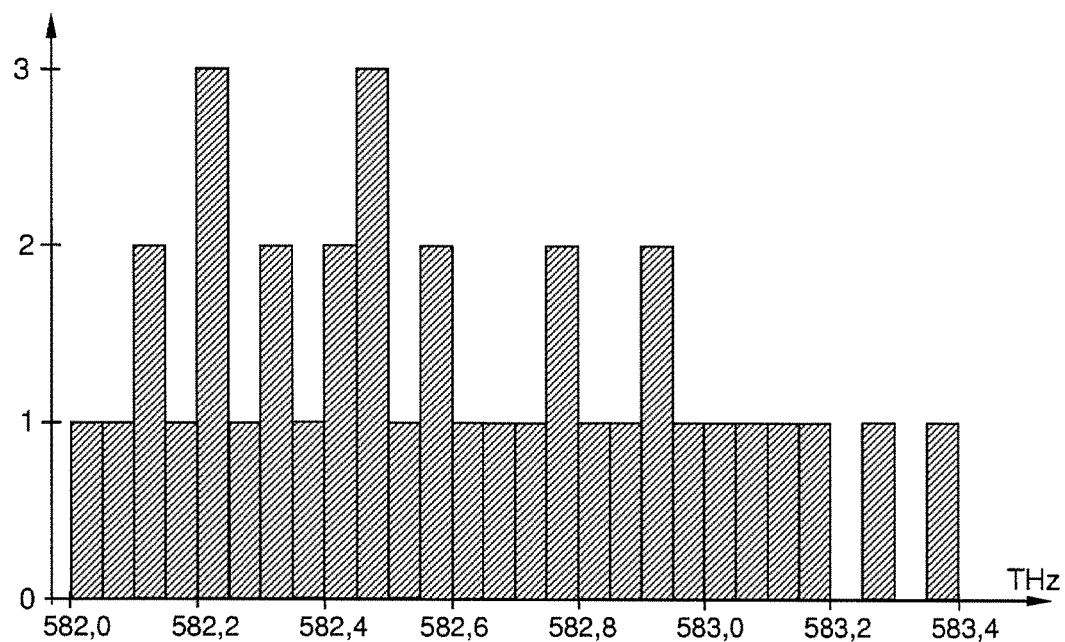
FIGS. 3A and 3B, diagrams representing theoretical spectra of the frequencies accessible by means of an emission method according to two examples of the present description.
Figure 3B:
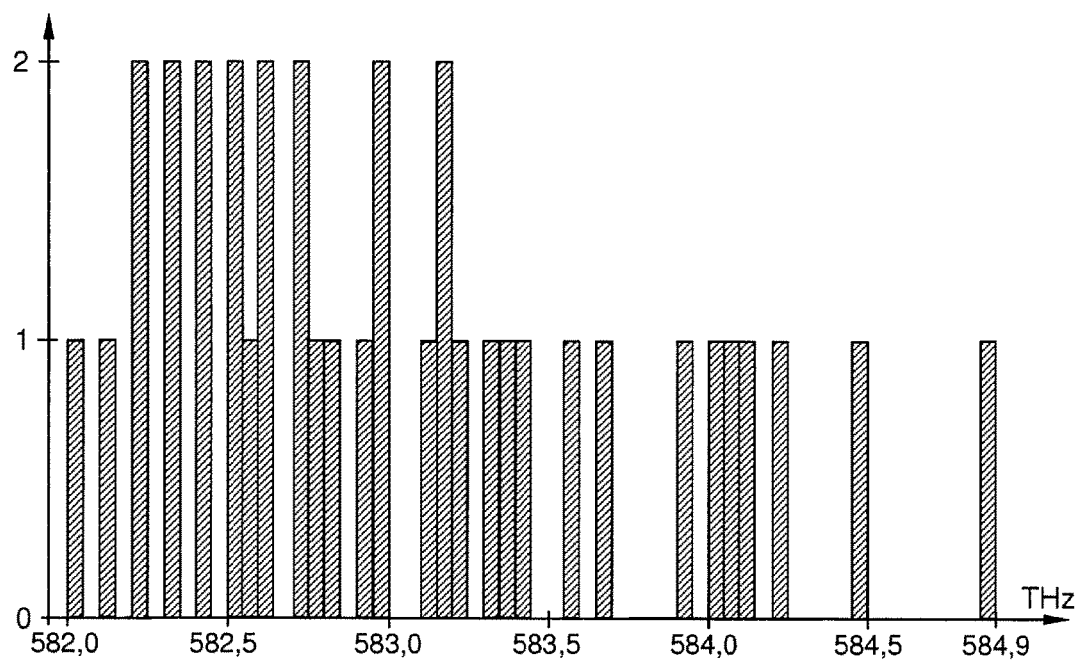

Depending on the selected differences $\Delta f_k$ between the central frequencies of the elementary sources, it is possible to give preference to, for a given number of elementary sources, either attaining a continuous or nearly continuous harmonic frequency spectrum over a given frequency range or attaining a spectrum of different frequencies spread over a larger frequency range. The difference between the central frequencies and the number of elementary laser sources are determined downstream by the needs of the user. The difference between two central frequencies $f_k$, and $f_{k+1}$ which follow one another can be either identical for all the pairs of elementary sources or, on the other hand, variable. FIGS. 3A and 3B thus illustrate two theoretical spectra obtained by means of a tunable source according to an example. The abscissa axis represents the frequency in THz and the ordinate axis represents the number of possible combinations for obtaining a given frequency equal to $2*f_j+f_l$ by varying j from 1 to N and l from 1 to N, by means of the device represented, for example, in FIG. 1A. In the example of FIGS. 3A and 3B, N=6, so that it is possible to obtain, at the output of the tunable laser source 36, from the central frequencies of the laser sources, frequencies that are included in the multi-spectral incident beam.

Thus, for example, FIG. 3A illustrates the 36 possible combinations for obtaining 26 different frequencies in the visible range from 6 elementary sources according to the device and the method of the present description. In this example, the lowest frequency of the 6 elementary sources used in the IR is approximately 194,000 THz, the highest frequency is approximately 194,460 THz, corresponding to a 0.46 THz spread in the IR. The central frequencies and the frequency differences between them are selected so as to produce a nearly continuous visible spectrum between 582 THz and 583.4 THz, or a spread of 1.4 THz. In FIG. 3A, it should be noted that it is possible to produce certain visible frequencies with several combinations of type $2*f_j+f_l$. For example, the frequency 582.2 THz can be obtained with three different combinations.

FIG. 3B illustrates a second example of a spectrum generated according to the device and the method of the present description, using 6 separate infrared elementary sources, as in the case of FIG. 3A. As in the preceding case, the lowest frequency used in the IR is 194,000 THz. This time the highest frequency is equal to 195,000 THz, or a maximum difference of 1,000 THz in the infrared range. The other 4 fundamental radiations involved in this example, between the above two extreme values, are selected so as to obtain the maximum of different radiations in the green portion of the optical spectrum, that is to say between 582,000 THz and 585,000 THz. In FIG. 3B, it should be noted that it is also possible to synthesize certain visible frequencies with several combinations of type $2*fj+fl$.

Depending on the need in terms of frequencies to be synthesized, it is possible to increase/reduce the number of starting elementary sources before amplification, the central frequency of each elementary source or the spacing between the respective frequencies of the sources.

Thus, the output beam $B_{out}$ at the output of the tunable source can have a frequency in the green, starting from an incident multi-spectral beam having frequencies in the infrared; the output beam $B_{out}$ at the output of the tunable source can also have a frequency in the ultraviolet, starting from an incident beam having frequencies between 1200 nm and 1300 nm, for example.

As an illustration, if one considers the example of a tunable laser source according to the present description, in which two elementary laser sources are used, for example, laser diodes, having central frequencies at 1.495 μm. and 1.497 μm. In this case, the frequency of the fifth beam $B_5$ at the output of the frequency doubling crystal will correspond to the second harmonic of the incident beam, that is to say to emission in the red. Thus, the attainable frequencies of the output beam $B_{out}$ are in the green/blue and can take on 4 values, namely 498.33 nm, 498.55 nm, 498.77 nm and 499 nm, if one limits oneself with the tunable optical filters at the central frequencies of the elementary sources, that are contained in the multi-spectral incident beam. Moreover, the residual beams at the output of the sum-frequency generation crystal are in the infrared and in the red.

If one now considers the example of a tunable laser source according to the present description in which two elementary laser sources are used, for example, laser diodes, having central frequencies at 1.03 μm and 1.04 μm. In this case, the frequency of the fifth beam $B_5$ at the output of the frequency doubling crystal will correspond to the second harmonic of the incident beam, that is to say to emission in the green. Thus, the attainable frequencies of the output beam $B_{out}$ are in in the violet and can take on 4 values, namely 343.33 nm, 344.44 nm, 345.55 nm and 346.66, if one limits oneself with the tunable optical fibers tunable to the central frequencies of the elementary sources, that are contained in the multi-spectral incident beam. Moreover, the residual beams at the output of the sum-frequency generation crystal are in the infrared and in the green.

According to a variant, the emission device of the multi-spectral incident laser beam of the tunable laser source according to the present invention can be stabilized upstream by known techniques such as the control of the frequencies on a molecular absorption line or by the "classic" interferometry techniques via Fabry Pérot cavities. By stabilizing the laser emission device, the emission of the tunable source is stabilized.

The tunable laser source according to the present description can operate in propagation mode in free space, in fiber propagation mode or in a mixed mode. The fiber propagation mode provides a very good mechanical stability and makes it possible to maintain the optical alignment of the tunable laser source; it is made possible because of the fact that all the components required for implementing the tunable source according to the present description are elements that may be fiber sources, the elementary laser sources, the optical amplifier, the optical filters, the coupler as well as the nonlinear crystals. Thus, the devices represented in FIGS. 1A and 1B can operate in fiber mode.

Although described by means of a certain number of detailed embodiments, the method and the frequency-tunable source according to the present description comprise different variants, modifications and improvements that will become apparent in an obvious manner to the person skilled in the art, it being understood that these different variants, modifications and improvements are part of the scope of the object of the present description as defined by the claims that follow.

The invention claimed is:

1. A frequency-tunable laser source comprising:
   a set of N elementary sources, N≥2, each elementary source being for emitting a beam at a given central frequency having a given spectral width;
   an optical coupler for coupling the beams emitted by each of the elementary sources to form a multi-spectral incident beam regrouping all the frequencies of the N elementary sources in a same optical beam;
   a beam splitter for forming, from the incident beam, a first beam, a first beam and a second beam, each regrouping all the emission frequencies of the elementary sources;
   a first tunable filter for selecting, from the first beam, a third beam at a first frequency;
   a second tunable filter for selecting, from the second beam, a fourth beam at a second frequency;
   a nonlinear frequency doubling crystal for generating, from the third beam at the first frequency, a fifth beam having a frequency which is twice the first frequency;
   a nonlinear sum-frequency generation crystal for generating, from the fifth beam coming from the nonlinear frequency doubling crystal and from the fourth beam at the second frequency, a beam having a frequency equal to the sum of twice the first frequency and the second frequency.

2. The frequency-tunable laser source according to claim 1, wherein the elementary sources are laser diodes, solid lasers or fiber lasers.

3. The frequency-tunable laser source according to claim 1, wherein at least one of the elementary sources has a tunable spectral band.

4. The frequency-tunable laser source according to claim 3, wherein the elementary sources each having a tunable spectral band, the differences between the central frequencies of two elementary sources having adjacent central frequencies are higher than the spectral tunable range of each of said elementary sources.

5. The frequency-tunable laser source according to claim 1, wherein the differences between the central frequencies of two elementary sources having adjacent central frequencies are higher than the spectral width of each of said elementary sources.

6. The frequency-tunable laser source according to claim 1, further comprising an amplifier for amplifying the incident beam.

7. The frequency-tunable laser source according to claim 1, wherein the frequency-tunable laser source is completely or partially a fiber laser source.

8. The frequency-tunable laser source according to claim 1, further comprising at least one control module for optimizing the coupling in at least one of the nonlinear frequency doubling or sum-frequency generation crystals.

9. The frequency-tunable laser source according to claim 1, further comprising a temperature control system of the nonlinear crystals.

10. A method for emitting a frequency-tunable laser beam, comprising:
    generating, from beams emitted by a set of elementary sources, a multi-spectral incident beam regrouping all the frequencies of N elementary sources in the same optical beam;
    splitting the incident beam into a first beam and a second beam, each regrouping all the emission frequencies of said elementary sources;
    selecting, from the first beam and by means of a first tunable filter, a third beam at a first frequency;
    selecting, from the second beam and by means of a second tunable filter, a fourth beam at a second frequency;
    generating, by means of a nonlinear frequency doubling crystal and from the third beam at the first frequency, a fifth beam having a frequency which is twice the first frequency;
    generating, by means of a nonlinear sum-frequency generation crystal and from the fifth beam coming from the nonlinear frequency doubling crystal and from the fourth beam at the second frequency, a beam having a frequency equal to the sum of twice the first frequency and the second frequency.

11. The method for emitting a tunable laser beam according to claim 10, further comprising amplification of the multi-spectral incident beam.

12. The method for emitting a tunable laser source according to claim 10, in which the emission of the beams coming from the elementary sources is continuous.

* * * * *